(12) United States Patent
Lowental (10) Patent No.: US 12,103,698 B1
(45) Date of Patent: Oct. 1, 2024

(54) UNMANNED AERIAL VEHICLE'S HYBRID DRIVE ASSEMBLY

(71) Applicant: Lowental Hybrid Ltd., Meishar (IL)

(72) Inventor: Itay Lowental, Meishar (IL)

(73) Assignee: Lowental Hybrid Ltd., Meishar (IL)

( * ) Notice: Subject to any disclaimer, the term of this patent is extended or adjusted under 35 U.S.C. 154(b) by 39 days.

(21) Appl. No.: 18/307,837

(22) Filed: Apr. 27, 2023

Related U.S. Application Data (63) Continuation of application No. 17/571,574, filed on Jan. 10, 2022, now Pat. No. 11,679,892.

(60) Provisional application No. 63/134,996, filed on Jan. 8, 2021.

(51) Int. Cl.

| | |
|---|---|
| B64D 35/08 | (2006.01) |
| B60L 53/24 | (2019.01) |
| B64C 39/02 | (2023.01) |
| B64D 27/02 | (2006.01) |
| B64D 27/24 | (2024.01) |
| B64D 35/02 | (2024.01) |
| B64U 50/11 | (2023.01) |
| B64U 50/19 | (2023.01) |
| H02K 7/10 | (2006.01) |
| H02K 7/116 | (2006.01) |
| H02K 11/00 | (2016.01) |

(52) U.S. Cl.
CPC .............. B64D 35/08 (2013.01); B60L 53/24 (2019.02); B64C 39/024 (2013.01); B64D 27/24 (2013.01); B64D 35/02 (2013.01); H02K 7/1004 (2013.01); H02K 7/116 (2013.01); H02K 11/0094 (2013.01); B64D 27/026 (2024.01); B64U 50/11 (2023.01); B64U 50/19 (2023.01)

(58) Field of Classification Search
CPC ........ B64D 35/08; B64D 27/24; B64D 35/02; B64D 27/026; B60L 53/24; H02K 7/1004; H02K 7/116; H02K 11/0094; B64U 50/11; B64U 50/19
See application file for complete search history.

(56) References Cited

U.S. PATENT DOCUMENTS

| | | | |
|---|---|---|---|
| 9,730,383 B2 * | 8/2017 | Greulich | F16H 7/1281 |
| 11,530,033 B2 * | 12/2022 | Preisser | B64C 27/14 |
| 11,679,892 B2 * | 6/2023 | Lowental | H02K 7/1004 |
| | | | 290/46 |
| 2016/0007526 A1 * | 1/2016 | Greulich | F16H 7/1281 |
| | | | 56/14.7 |
| 2020/0407052 A1 * | 12/2020 | Preisser | B64C 27/14 |
| 2022/0348342 A1 * | 11/2022 | Lowental | H02K 11/04 |
| 2023/0356836 A1 * | 11/2023 | Von Bertouch | B64C 29/0016 |

* cited by examiner

Primary Examiner — Pedro J Cuevas
(74) Attorney, Agent, or Firm — The IP Law Firm of Guy Levi, LLC (57) ABSTRACT

The disclosure is directed to drive assemblies for unmanned aerial vehicles (UAVs). Specifically, the disclosure is directed to hybrid drive assembly and control system for UAVs, utilizing indexed belt tension modulation to couple and decouple an electric motor and an internal combustion engine.

20 Claims, 6 Drawing Sheets

UNMANNED AERIAL VEHICLE'S HYBRID DRIVE ASSEMBLY

CROSS REFERENCE TO RELATED APPLICATIONS

This application is a continuation in part to co-pending U.S. application Ser. No. 17/571,574 filed on Jan. 10, 2022, which claims priority from now expired U.S. Provisional Application No. 63/134,996 filed Jan. 8, 2021, both which are incorporated herein by reference in their entirety.

BACKGROUND

The present disclosure relates to drive assemblies for lightweight unmanned aerial vehicles (UAVs). Specifically, the disclosure relates to hybrid drive assembly and control system for lightweight UAVs, utilizing belt tension modulation.

Unmanned aerial vehicles ("UAVs") are remotely piloted or self-piloted aircraft that can carry cameras, sensors, communications equipment, or other payloads. A UAV is capable of controlled, sustained, level flight and is often powered by either a gas turbine or a reciprocating internal combustion engine. The UAVs may be remotely controlled, or may fly autonomously based on pre-programmed flight plans or more complex dynamic automation systems.

UAVs are increasingly used for various applications where the use of manned flight vehicles is not appropriate or is not feasible. Such applications may include military situations, such as surveillance, reconnaissance, target acquisition, data acquisition, communications relay, decoy, harassment, or supply flights. These vehicles are also used in a growing number of civilian applications, such as firefighting when a human observer would be at risk, police observation of civil disturbances or crime scenes, reconnaissance support in natural disasters, and scientific research, such as collecting data from within a hurricane. Additional applications are being developed, for example in delivery of packages, or medication to remote areas.

Furthermore, advances in technology have led to an explosion in the use of small, unmanned aircraft systems (UAS). Small UAS have proven to be particularly effective for performing persistent intelligence, surveillance and reconnaissance (ISR) missions for the military and private sectors. Many military combatant commanders have developed an insatiable appetite for this asymmetric advantage over the enemy. Civilian law enforcement agencies and the Department of Homeland Security have also rapidly adopted the aircraft for their unprecedented capabilities. For example, UAS may be used to provide aerial photography, surveying land and crops, monitoring forest fires and environmental conditions, and protecting borders and ports against intruders.

Despite the exponential increase in UAS employment, and due to ever-increasing operational requirements; most currently available UAS are lacking in their endurance and/or the stealth attributes. Ignoring inferior acoustic and thermal signatures, internal combustion engine driven aircrafts may not possess adequate endurance for prolonged ISR (and other) missions.

Electric propulsion systems can be nearly silent and have a diminished thermal signatures compared with the thermal signature associated with internal combustion engines. However, electric drive systems suffer from dismal endurance times due to relatively low specific energies and rates of depletion of current battery technology. While each system possesses desired mission attributes, alone, neither is completely sufficient to meet mission critical attributes.

These and other issues are addressed by the disclosed technology.

SUMMARY

Disclosed, in various exemplary implementations, are a drive assemblies for lightweight unmanned aerial vehicles (UAVs). Specifically, disclosed are hybrid drive assemblies and control systems, utilizing belt tension modulation to optimize operational performance of lightweight UAVs.

In an exemplary implementation provided herein is a hybrid drive assembly for an unmanned aerial vehicles UAV) comprising: a housing frame an internal combustion engine (ICE) basally coupled to the housing frame; an electric motor (EM) having a shaft, apically and rotatably coupled to the housing frame; a propeller, rotatably coupled to the EM's shaft; a belt, operably coupled to the EM and the ICE; an adjustable coupling module, operably coupled to the housing frame, configured to selectably couple and decouple the EM and the ICE by selectably modulating the belt tension; and a central processing module (CPM) in communication with the adjustable coupling module, the EM, the ICE, and at least one processor with a non-transitory memory device storing thereon a computer-readable medium with an executable set of instructions, configured when executed to cause the processor to regulate the operation of the ICE, the EM, the adjustable coupling module, or any combination thereof.

In another exemplary implementation, the adjustable coupling module comprises: a drive unit mounted on a basal end of the front beam of the housing's left bracket, the drive unit being in communication with the CPM; a guiding rail coupled to the front beam of the housing's left bracket; a sled coupled to the guiding rail, the sled defining a channel configured to slidably engage a guiding rail and an arm extending apically from the sled; a tension pulley, rotatably coupled to the sled and the tension belt; a locking member, defining a plurality of peripheral notches, the locking member operably coupled to the drive unit and to the sled; and a cam, hingedly coupled to a base frame, wherein the cam is configured to engage a peripheral notch defined in the locking member.

In yet another exemplary implementation, the hybrid drive assembly further comprises: a rechargeable power source electrically coupled to the EM; an electronic speed controller (ESC) in electronic communication with the rechargeable power source, the EM and the CPM; a charge controller; and a rectifier in communication with the CPM.

These and other features of the hybrid drive assemblies and control systems for UAVs and/or UAS, utilizing indexed belt tension modulation will become apparent from the following detailed description when read in conjunction with the drawings, which are exemplary, not limiting, and wherein like elements are numbered alike in several figures.

BRIEF DESCRIPTION OF THE FIGURES

For a better understanding of the hybrid drive assemblies and control systems for UAVs and/or UAS, utilizing indexed belt tension modulation, with regard to the exemplary implementations thereof, reference is made to the accompanying drawings, in which like numerals designate corresponding elements or sections throughout and in which.

DETAILED DESCRIPTION

Provided herein are exemplary implementations of hybrid drive assemblies and control systems for UAVs and/or UAS, utilizing indexed belt tension modulation.

Provided herein are drive assemblies configured to deliver two separate and complimentary moment-generating sources. An electric motor (EM); powered by rechargeable power source (602, see e.g., FIG. 6), with fixed and limited energy, which weight is constant and is not consumed during flight. In addition, the EM produces maximal yield that is relatively high when compared to the motor weight and the rechargeable power source's (RPS) weight. Moreover, actuation of the EM is instantaneous and does not require extended actuation times and stabilization. Additionally, the ICE has a relative low energy consumption due, in part to high energy density of the fuel. Furthermore, the ICE has a relatively low inherent weight compared with output through the use. In certain exemplary implementation of the ICE can be a single cylinder, two-stroke engine.

By using the disclosed hybrid drive assemblies and control systems, to coordinate the optimal operation of the ICE (e.g., Watts as a function of fuel consumption and RPM) with the optimal operation of the propeller (e.g., fixed pitch, thrust (drag), as a function of RPM), it is possible to improve energy consumption by about 4-fold.

For example, factors used to optimize the performance of the UAV can be at least one of the propeller RPM, (dynamic) thrust (or drag) produced by the propeller, DC current and voltage entering the EM, and ICE fuel consumption. Using these parameters, the ratio of thrust over electric output (Watts) can be calculated. In addition, using statistical techniques, such as principal component analysis, readings (measurements, e.g., of the same parameters) taken at various altitudes and flight velocities can provide the optimal working parameters.

Other parameters used in certain exemplary implementations can comprise, for example; altitude, air temperature, air humidity, compression ratio (of the piston in the ICE), or a combination comprising one or more of the foregoing. These parameters are measured continuously and fed to the CPM using an array of sensors distributed throughout the UAV/UAS.

The EM provided is configured to have negligible reaction time during actuation (in other words, turning the EM on) and go from 0 to 100% output in a very short time, without any preliminary processes, allowing for launching of the UAS/UAV without the need to start the ICE when the UAV/UAS is coupled to the (e.g., catapult) launcher. For example, the catapult launcher can be pneumatic launcher, using compressed air, or in another implementation, using a biasing means such as a bungee cord. Magnetic levitation launchers may also be used.

Accordingly, using the hybrid drive assemblies disclosed, it may be unnecessary for the propeller to rotate thus interfering with the launcher's geometry, nor is the UAV engine affects or is being affected by the developing acceleration.

Conversely, once decoupled from the launcher, the EM can actuate at full output capacity, allowing for rapid ascend to 600 m-1000 m (2000-3000 ft) and more if required, with relatively low acoustic and thermal signature where detection risk would have been the highest. It is noted that for reduction in acoustic signature, at any mission-critical stage of the assignment, the ICE can be decoupled leaving the EM solely operational thus reducing both acoustic and thermal footprint of the UAV/UAS.

In an exemplary implementation, the EM used in the drive assemblies provided herein can be configured to at least on of:
  a. Provide the sole propulsion source to the UAS/UAV upon launch, to altitude of about 5,000 feet;
  b. actuate the ICE upon receiving the command to actuate the ICE;
  c. be used as the drive shaft when coupled to the ICE, even when not in operation;
  d. be used as an alternator to produce stabilized electric output in the range of between about 40 Watt and 120 Watt;
  e. be used as at least one of a support and a sole propulsion system in circumstances under circumstances when low heat and/or noise signature is required; and
  f. be used as a hybrid drive system to augment thrust output, in e.g., range, power, operational time and their combination.

Likewise, the ICE can be configured to:
  a. using the transmission band, driving (rotating) the propeller at an power for cruising at altitude of between about 5,000 feet and 10,000 feet (e.g., 8,000 ft.)
  b. using the rotating propeller, which is inherently rotatbly coupled to the EM, power the EM as an alternator to recharge the RPS thus provide electricity to at least one of on-board flight systems, sensors, communication and other power consuming elements.

In an exemplary implementation, the indexed tension module used in the drive assemblies provided herein was developed using a ribbed belt configuration, the tension module can be configured to:
  a. enable a transmission ratio that will correlate and coordinate between the optimal operational profile of the ICE at a predetermined cruising altitude (as well as temperature, humidity, compression ratio, or fuel pressure), e.g., about 8,000 ft. above sea-level;
  b. provide momentary load and vibration dampening between the ICE and the propeller;
  c. enable coupling/decoupling of the ICE and electric motor under substantial packaging constraints.

The tension module used in the drive assemblies provided herein can be configured to operate between two states; coupled and decoupled. In the decoupled state (see e.g., FIG. 4A), there is no friction (the result of the tension) or contact between the tension (ribbed) belt (250, see e.g., FIG. 2), the ICE pulley (201, see e.g., FIG. 2) and the EM pulley (411, see e.g., FIG. 2), in other words, the ICE is neutralized and only the EM is rotatably coupled to the propeller (800, see e.g., FIG. 1). In an exemplary implementation, the term "rotatably coupled" means that two components are attached to each other, perhaps via one or more other components, such that one or both of the two components can rotate. Additionally, or alternatively, the term "rotatably coupled" refers to a situation where one element is coupled to another element in a fixed spatial relation, but is free to rotate with respect to the other element. In other words, no substantial lateral movements of the two elements take place, while relative rotation between the two elements is possible. In yet other words, the term "rotatably coupled" refers to a situation where the rotation of the one element does not necessarily result in a rotation of the other element and vice versa. The one element may be supported with respect to or mounted to the other element in a way that permits rotation, such as via a ball bearing.

Conversely, in the coupled state (see e.g., FIG. 4B), the tension module's pulley (411, see e.g., FIG. 2) is urged against the tension belt (250, see e.g., FIG. 2), creating friction and contact between the ICE pulley (201, see e.g., FIG. 2) and the EM pulley (301, see e.g., FIG. 2), thus coupling the two drive shafts.

Definitions

The term "module", when used in connection with the tension module, relates to an independent unit or a unit that is a part of a larger apparatus or assembly, in which tension modulation is indexed. Tension modulating can comprise, for example coupling or decoupling the ICE and EM by index modulation of the tension belt using the tension pulley.

The term "biaser" refers to any device that provides a biasing force. Representative biasing elements include but are not limited to springs (e.g., elastomeric or metal springs, torsion springs, coil springs, leaf springs, tension springs, compression springs, extension springs, spiral springs, volute springs, flat springs, and the like), detents (e.g., spring-loaded detent balls, cones, wedges, cylinders, and the like), pneumatic devices, hydraulic devices, magnets, and the like, and combinations thereof. Likewise, "biaser" as used herein refers to one or more members that applies an urging force between two elements, for example, between the tension pulley and the tension belt.

The term "avionics" also encompasses auto-pilot functions, which allow a computer to make inputs to the pilot's controls. In the UAV provided, using the assemblies disclosed, the avionics systems may be placed in a "pod" or housing to share, for example, power supplies, processors, memory, operating systems, utility software, hardware, built-in test equipment, and input/output ports (e.g, such as the bidirectional switch disclosed herein). This grouping of avionics is known in the art as integrated modular avionics ("IMA"). Accordingly and in an exemplary implementation, at least one of the ESC, rectifier, and the bidirectional switch are a part of the IMA and the RPS is configured to power the IMA.

In connection with the central processing module (CPM), the term 'module', as used herein, means, but is not limited to, a software or hardware component, such as a Field Programmable Gate-Array (FPGA) or Application-Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another.

The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the gear(s) includes one or more gears). Reference throughout the specification to "one exemplary implementation", "another exemplary implementation", "an exemplary implementation", and so forth, means that a particular element (e.g., feature, structure, and/or characteristic) described in connection with the exemplary implementation is included in at least one exemplary implementation described herein, and may or may not be present in other exemplary implementations. In addition, it is to be understood that the described elements may be combined in any suitable manner in the various exemplary implementations.

In an exemplary implementation, the term "coupled", including its various forms such as "operably coupling", "operably coupled", "coupling" or "couplable", refers to and comprises any direct or indirect, structural coupling, connection or attachment, or adaptation or capability for such a direct or indirect structural or operational coupling, connection or attachment, including integrally formed components and components which are coupled via or through another component or by the forming process. Indirect coupling may involve coupling through an intermediary member or adhesive, or abutting and otherwise resting against, whether frictionally or by separate means without any physical connection.

In another exemplary implementation, the term "Communicate" (and its derivatives e.g., a first component "communicates with" or "is in communication with" a second component) and grammatical variations thereof are used to indicate a structural, functional, mechanical, electrical, optical, or fluidic relationship, or any combination thereof, between two or more components or elements. As such, the fact that one component is said to communicate with a second component is not intended to exclude the possibility that additional components can be present between, and/or operatively associated or engaged with, the first and second components.

In addition, the term "slidably coupled" is used in its broadest sense to refer to elements which are coupled in a way that permits one element to slide or translate within, or with respect to another element.

The term "another", as used herein, is defined as at least a second or more. The terms "including" and/or "having", as used herein, are defined as comprising (i.e., open language).

The term "engage" and various forms thereof, when used with reference to the EM pulley and/or the ICE pulley, refers to one or a plurality of coupled components, at least one of which is configured for releasably engage EM pulley or the ICE pulley. Thus, this term encompasses both single part engaging elements and multi-part-assemblies.

As may also be used herein, the terms "module", "processing circuit" (for example, the CPM, and/or the bidirectional transmission switch) may be comprised in a printed circuit board, and/or "processing unit" may be a single processing device or a plurality of processing devices. Such a processing device may be a microprocessor, micro-controller, digital signal processor (DSP), microcomputer, central processing unit (CPU), field programmable gate array, programmable logic device, state machine, logic circuitry, analog circuitry, digital circuitry, and/or any device that manipulates signals (analog and/or digital) based on hard coding of the circuitry and/or operational instructions (in other words, firmware).

In the context of the disclosure, the term "operable" means the system and/or the device and/or the program, or a certain element or step is fully functional, sized, adapted and calibrated, comprises elements for, and meets applicable operability requirements to perform a recited function when activated, coupled, implemented, actuated, effected, realized, or when an executable program is executed by at least one processor associated with the system and/or the device. In relation to computerized systems and circuits, the term "operable" means the system and/or the circuit is fully functional and calibrated, comprises logic for, having the hardware and firmware necessary, as well as the circuitry for, and meets applicable operability requirements to perform a recited function when executed by at least one processor.

Figure 2:
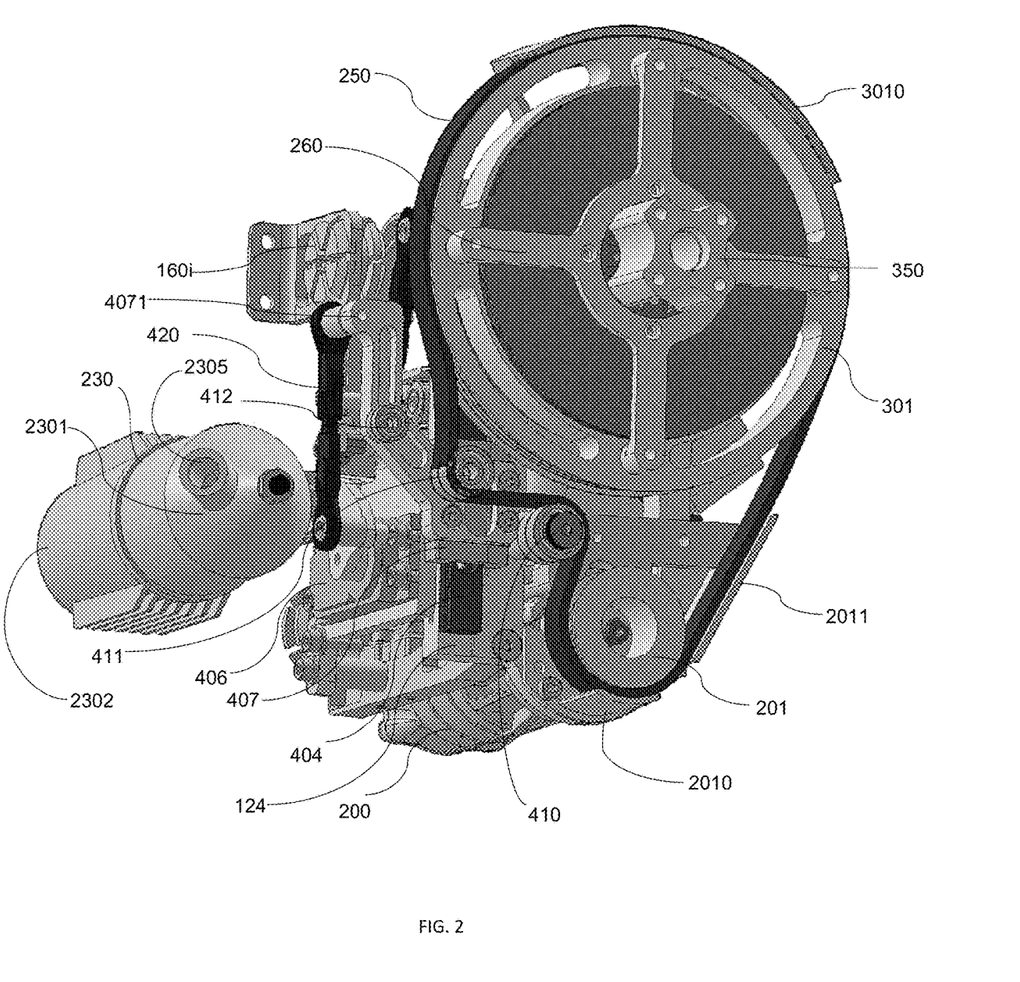
FIG. 2 illustrates a schematic showing a front left perspective view of an exemplary implementation of hybrid drive assemblies and control systems for UAVs and/or UAS, utilizing indexed belt tension modulation.

In an exemplary implementation, the hybrid drive assemblies provided herein further comprise a tension belt retainer (see e.g., element 202, FIG. 2A), configured to maintain contact between the tension belt and the ICE pulley (see e.g., element 201, FIG. 2A), thus ensuring there is no contact between the tension belt (see e.g., element 250, FIG. 2A) and the EM pulley (see e.g., element 301, FIG. 2A).

In an exemplary implementation, the EM can be a brushless electric motor, or in other words, an alternate current motor with fixed magnets. To generate alternate current from the direct current (DC) output of the RPS (602, see e.g., FIG. 6), in an exemplary implementation, an electronic speed controller (ESC) (601, see e.g., FIG. 6) is being used. This controller is used as an inverter in yet another exemplary implementation, converting the direct current (DC) to alternating current (AC). The ESC can be configured to generate a pulse-width-modulated (PWM) waveform with a duty cycle (of the alternating current) that is inversely proportional to the input voltage.

In an exemplary implementation, the hybrid drive assemblies described herein further comprise a central processing module (CPM) operating as a bidirectional transmission switch disposed on the three-phased power supply between the ESC and the RPS, configured to switch and direct the RPS power to two states; namely in a first state, the power is supplied solely to the EM, without the hybrid system coupled thereto (e.g., during UAV launch), or a second state in which the three-phased power supply generated and transmitted by the EM is disconnected from the ESC, and is instead connected to a rectifier that will then charge the RPS.

The following table illustrates the UAV systems' status resulting from the two switch configurations:

TABLE 1

Systems' Status as a function of Switch configuration:

| System Function | Switch Config. | EM Speed Cmd. | ICE Speed Cmd. |
| --- | --- | --- | --- |
| Launch or EM only | ESC coupled solely to EM | 100% linked to flight control module (e.g., on-board computer, automatic pilot) | NA |
| Actuating ICE | ESC coupled to EM | 40% linked to flight control module | 10% linked to flight control module |
| ICE operational, crusing and charging | current generated by EM is disconnected, rectifier engaged | NA | 100% linked to flight control module |
| Hybrid Propulsion | ESC coupled to EM | linked to flight control module | Linked to flight control module |

In another exemplary implementation, the CPM can further comprise; bidirectional transmission terminals; inverter input/output to the alternator; current stabilizer input/output, current sensor among the three phases and is in communication with a memory having thereon a processor-readable medium comprising a set of executable instruction that, when executed cause the processor to: upon launch, actuate the EM until the predetermined altitude is obtained; upon receiving a command from the flight control module (which can be ground-based, remote), actuate the ICE; and upon receiving a command, engaging the tension module thus affecting the urging of the tension pulley into the tension belt, engaging the ICE to drive the propeller. Furthermore, when executed—the set of executable instruction further cause the processor to: channel power from the rechargeable power source to the EM alone; and disconnect the EM phases from the ESC. The term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In yet another exemplary implementation, during the operation of the UAV using the drive systems disclosed and claimed herein, the user piloting the UAV may need certain data to assist in flying the aircraft. This data includes, for example air speed, altitude, weather, humidity, location, heading and other navigational data. The data can be generated by the transducers or sensors, which are located in various parts of the aircraft. The systems used to generate and report this and other information management data is generally termed "avionics".

Moreover, the UAV/UAS using the drive assemblies provided are further equipped with flight control system (FCS) (604, see e.g., FIG. 6) configured to enable at least one of fly-by-wire (FBW) capabilities, and fly-by-light (as optical fiber and/or solid state optical data communication and control circuitry becomes more commonly used) capabilities, where control of all critical flight control parameters can be effected by computerized control systems. Pilot controlled input sensors located remotely are configured to generate electrical command control inputs to a computer control system (CCS, interchangeable with CPM) which also receives feedback electrical inputs representing the actual current state of the aircraft (e.g., its position, attitude, speed, etc). Based on such electrical inputs, the computerized control system generates electrical output signals that are routed to electromechanical actuators or other suitable transducers to control critical aircraft control parameters (e.g., aircraft control surfaces and systems, etc.).

In an exemplary implementation, when executed-a set of executable instruction further cause the processor to affect the configuration of Table 1 hereinabove, namely: during launch of the UAV, or during sole electric motor operation, electronically couple the ESC to the EM; during actuating the ICE, electronically couple the ESC to the EM and to the ICE at a predetermined control ratio; during at least one of operation of the ICE, UAV cruising and rechargeable power source charging, electronically decouple the ESC from the EM; and during combined operation of the EM and the ICE, electronically couple the ESC to the EM.

Furthermore, during actuating the ICE by the EM, the predetermined ESC control ratio is about 4:1 electric motor control to internal combustion engine control. Likewise, during launch of the UAV, or during sole electric motor operation, the electronic motor is further configured to solely receive operation commands from a flight control module, or an automatic pilot module and the like. In addition, during at least one of operation of the ICE, UAV cruising and rechargeable power source charging, solely the ICE is further configured to receive operation commands from a flight control module, and during combined operation of the EM and the ICE, both the ICE and the EM are further configured to receive operation commands from a flight control module.

In an exemplary implementation, when executed—the set of executable instruction further cause the processor to, at least one of: decouple the ICE form the EM when the intra-phases current has dropped below a predetermined level; or, in other circumstances, decouple the ICE from the EM when the intra-phases current did NOT dropped below a predetermined level after a predetermined period. For example, using the measurement of incoming DC current measurement to the ESC from the EM, either a decrease of about 40%, and/or upon receiving indication from the avionics systems that the propeller RPM is about 3,000 RPM and is stable, which would indicate the ICE is operational and the ignition attempts using the EM can now terminate. Conversely, after a predetermined period, for example, 10 second and regardless of the DC current reading (measurement), power to the ESC will be cut and the propeller RPM will be measured. If the measured RPM is either less than the predetermined value (e.g., 3,000 RPM) or the reading is unstable, the control system will measure the altitude and if the UAV is still within its mission-defined, predetermined flight envelope parameters' threshold, the EM will be coupled to the ICE and attempt again to ignite the ICE, otherwise, the system will divert power solely to the EM to bring the UAV within the mission-defined, predetermined flight envelope's parameters.

A more complete understanding of the components, processes, and devices disclosed herein can be obtained by reference to the accompanying drawings. These figures (also referred to herein as "FIG.") are merely schematic representations based on convenience and the ease of demonstrating the presently disclosed devices, and are, therefore, not intended to indicate relative size and dimensions of the devices or components thereof and/or to define or limit the scope of the exemplary exemplary implementations. Although specific terms are used in the following description for the sake of clarity, these terms are intended to refer only to the particular structure of the exemplary implementations selected for illustration in the drawings, and are not intended to define or limit the scope of the disclosure. In the drawings and the following description below, it is to be understood that like numeric designations refer to components of like function.

Figure 1:
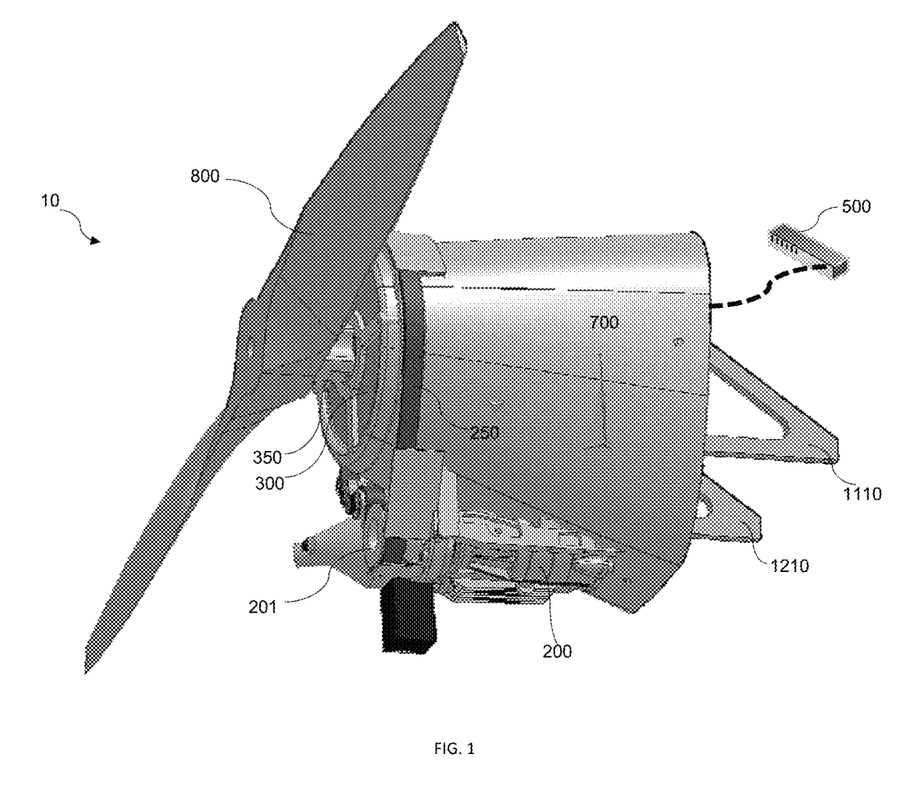
FIG. 1 illustrates an exemplary implementation of the hybrid drive assemblies coupled to a propeller.

Turning now to FIG. 1, illustrating an exemplary implementation of the drive assemblies disclosed herein. As illustrated, drive assembly 10, for an unmanned aerial vehicles UAV/UAS comprises housing 700, an internal combustion engine 200 having ICE pulley 201 rotatbly coupled to ICE 200 and tension belt 250, ICE 200 being basally coupled to housing 700; electric motor 300 further comprising electric motor (EM) 300 pulley 301 (see e.g., FIG. 2) and EM drive shaft 350, operably coupled to propeller 800 (see e.g., FIG. 1). EM 300 is being apically coupled to housing frame 100. The drive assembly further comprises the propeller 800 (see e.g., FIG. 1), rotatably coupled to EM 300. Further, tension belt 250, operably coupled to EM 300 and ICE 200 via EM pulley 301 and ICE pulley 201. Tension module (see e.g., FIGS. 4A, 4B) is also coupled to housing frame 100 and is configured to couple and decouple EM 300 and ICE 200 by selectably index modulate tension belt 250 tension.

In an exemplary implementation, the term "modulating" refers to the application of the tension pulley at a desired urging force, in order to accomplish a desired result, such as gradual synchronization in a rotational speed of rotating members such as EM 300 pulley 301 and ICE pulley 201 by tension belt 250.

Turning now to FIGS. 1-4B, provided herein is hybrid drive assembly 10 for UAV/UAS comprising: housing frame 100 internal combustion engine (ICE) 200 basally coupled to housing frame 100; electric motor (EM) 300 having shaft 350, apically and rotatably coupled to housing frame 100; propeller 800, rotatably coupled to EM's shaft 350; belt 250, operably coupled to EM 300 and ICE 200; adjustable coupling module, operably coupled to housing frame 100, configured to selectably couple and decouple EM 300 and ICE 200 by selectably modulating belt 250 tension; and central processing module (CPM) 500 in communication with adjustable coupling module, EM 300, ICE 200, and at least one processor in communication with non-transitory memory device, storing thereon computer-readable medium with executable set of instructions, configured when executed to cause the at least one processor to regulate operation of ICE 200, EM 300, adjustable coupling module, or any combination thereof. As further illustrated in FIG. 2, the hybrid drive assembly further comprises plurality of vibration dampeners 160i; and guard frame 360, operably coupled to EM 300.

Figure 3:
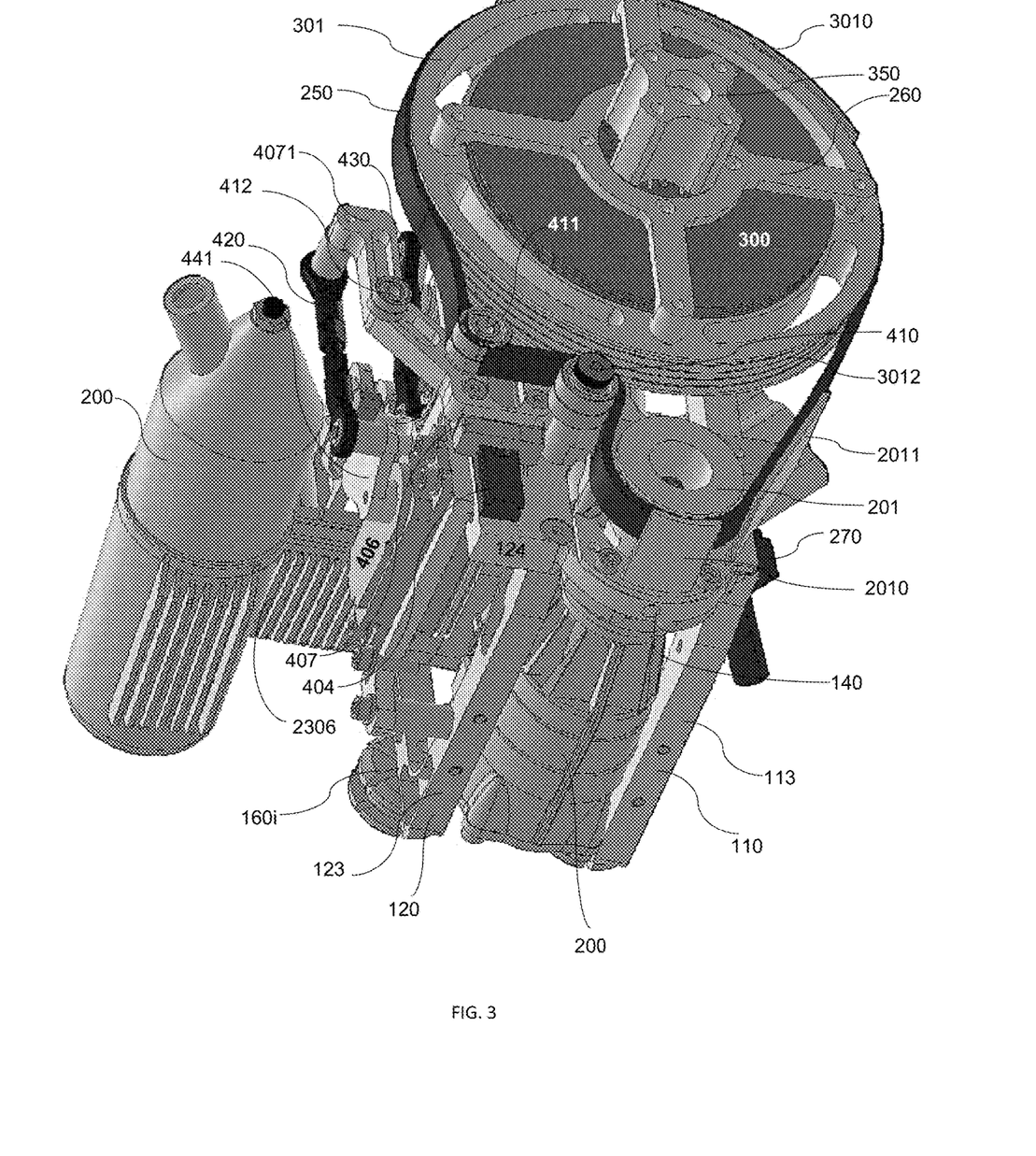
FIG. 3, illustrates a schematic showing a front bottom left perspective of the hybrid drive assemblies and control systems for UAVs and/or UAS, utilizing indexed belt tension modulation.

As further illustrated in FIG. 2-4B, the tension module 400 used in the drive assemblies disclosed herein, comprise: drive unit 401 mounted in base frame 440, for example on right side frame 100 front beam 124. Adjustable tension module 400 comprises then: drive unit 401 mounted on basal end of front beam 124 of housing's right bracket 120, drive unit 401 being in communication with CPM 500 (see e.g., FIG. 1), with guiding rail 404 coupled to front beam 124 of housing's right bracket; sled 407 coupled to guiding rail 404, sled 407 defining channel 4072 configured to slidably engage guiding rail 404 and arm 4071 extending apically from sled 407; tension pulley 411, rotatably coupled to sled 407 and tension belt 250; locking member 441 (see e.g., FIGS. 4A, 4B), defining plurality of peripheral notches 4410, 4411, locking member 441 operably coupled to drive unit 401 and to sled 407; and cam 4400, hingedly coupled to base frame 440, wherein cam 4400 is configured to engage peripheral notch 4410, or 4411, defined in locking member. Also illustrated in FIGS. 2, 3, are EM pulley 301 retainer 3010, coupled to frame 100, configured to maintain belt 250 at fixed distance from EM pulley 301 when in the decoupled configuration, similar to ICE pulley retainers 2010, and 2011. Wiring terminal 406 is also shown, as well as ICE 200 fuel tank 230, having front portion 2301, and rear portion 2302 with inlet 2305 defined in front portion 2301. Routing pulleys 410, coupled to front beam 124 of right bracket 120, and arm pulley 412 are also illustrated. In addition, coupling rod 420, coupling locking member 441 (see e.g., FIG. 4A) to sled 407 arm 4071 is also illustrated, with FIG. 3, also illustrating throttle rod 430.

Figure 4A:
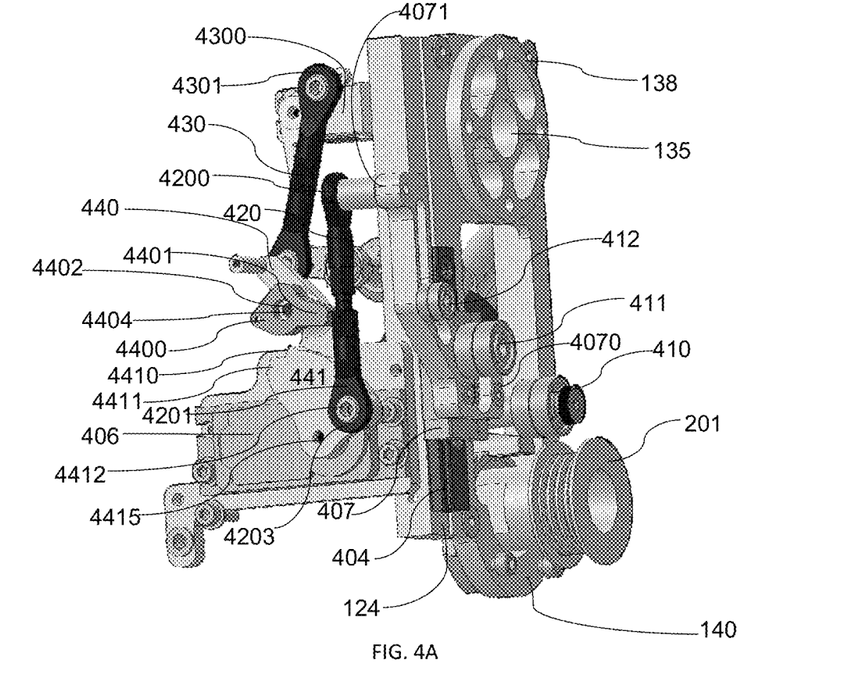
FIG. 4A, illustrates a schematic showing a left perspective view of an exemplary implementation of the tension modulating module in ICE:EM decoupled position, with FIG. 4B illustrating certain components' configuration in ICE:EM coupled position.
Figure 4B:
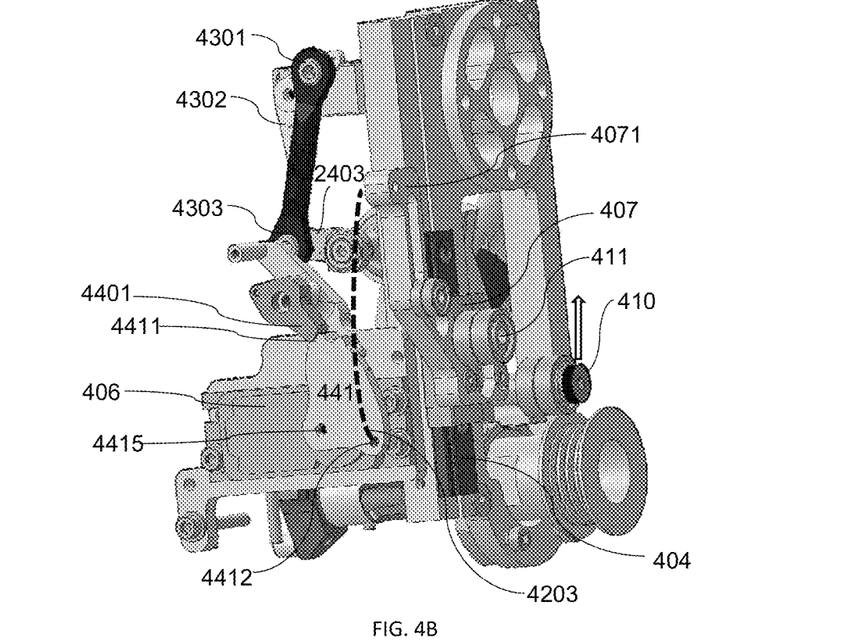

As illustrated in FIGS. 4A, 4B, adjustable coupling module 400 further comprises: coupling rod 420 having first end 4200 coupled to upper arm 4701 of sled 407 and second end 4201 hingedly coupled to locking member 441; and biasing element 4402 hingedly coupling cam 4400 to base frame 440, operable to bias protrusion 4401 extending from cam 4400 toward locking member 441, protrusion 4401 configured to alternately engage plurality of peripheral notches 4410, 4411, defined in locking member 441, wherein upon actuating drive unit 401 (e.g., a servo motor), locking member 441 is configured to rotate, causing coupling rod 420 to translate either upward or downward thereby translating tension pulley 411 against belt 250 and engaging or disengaging ICE 200 pulley 201 and the EM 300 pulley 301. For example, and in an exemplary implementation, in ICE: EM 200:300 coupled state, coupling rod 420 is translated downward causing tension belt 250 to engage ICE 200 pulley 201.

Figure 5:
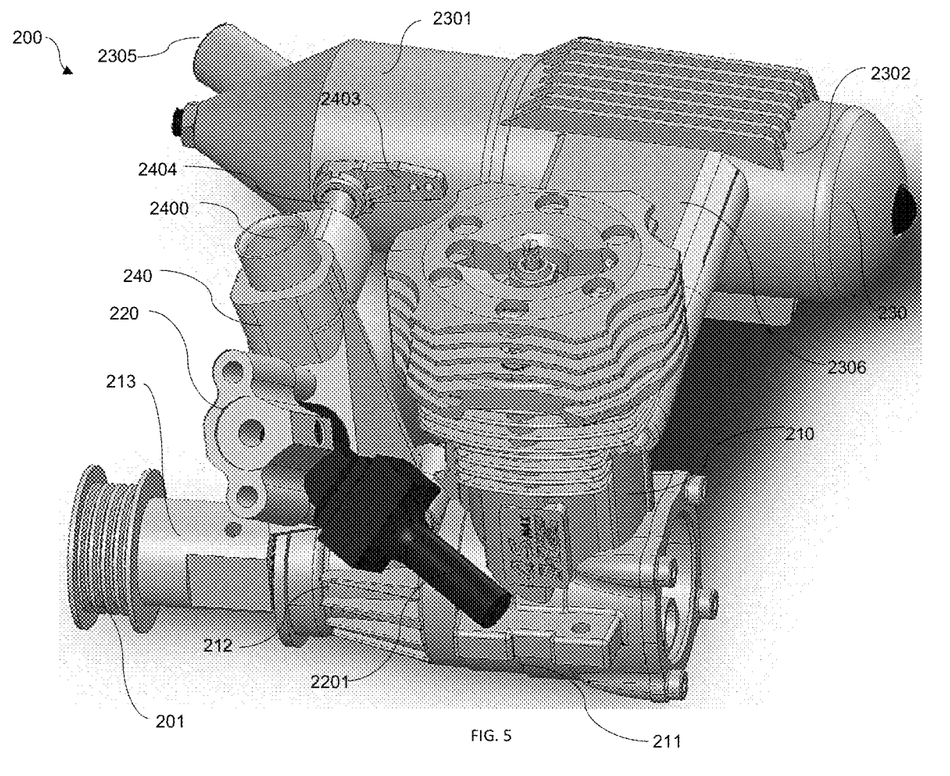
FIG. 5 illustrates a schematic showing a rear top left perspective of the ICE.

Turning now to FIG. 5, illustrating an exemplary implementation of ICE 200. As illustrated, ICE 200 comprises combustion chamber 210, gear chamber 211, shaft couple 212 with shaft 213 terminating with ribbed (for increased friction) ICE pulley 201. Further, ICE 200 combustion chamber 210 has volume of between 6 cubic centimeter (cc) and 25 cc, ICE 200 further comprises single point fuel injection (SPFI) module 220 in communication with CPM 500. As illustrated, the SPFI system 200 refers to fuel injection system that uses a single fuel injector for mixing of the fuel with air. It has only one injector (not shown) that injects the fuel before entering into intake compartment 220 having intake opening 2400, where the fuel is mixed with air before the throttle valve 2404. Fuel intake port 2201 is also illustrated. Likewise, bridge 2306, structurally coupling fuel tank 230 and ICE 200 is illustrated. In certain exemplary implementations, bridge 2306 can be a housing for various avionics components, for example thermocouples, and the like. As illustrated in FIGS. 4A, 4B, and 5, throttle 2403 is hingedly coupled to upper end 4301 of throttle rod 430, while basal end 4303 is coupled to base frame 440. Furthermore, SPFI module 220 further comprises pressure gauge (not shown) in communication with CPM 500, the pressure gauge operable to measure fuel pressure in the SPFI module 220. In another exemplary implementation, ICE 200 combustion chamber 210 comprises: a plurality of cylinders or pistons; and a manifold in liquid communication with the plurality of cylinders, while the SPFI module 220, wherein the pressure gauge is operable to measure manifold pressure.

Figure 6:
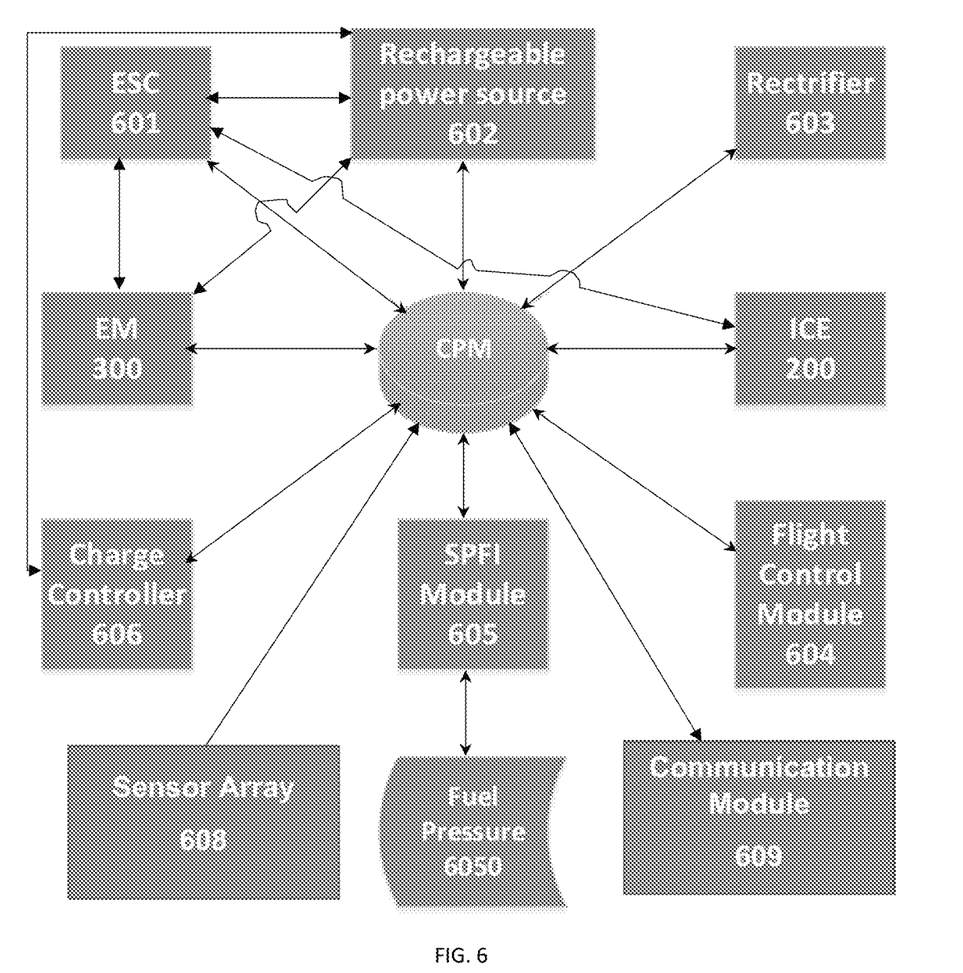
FIG. 6, illustrates a schematic showing an exemplary implementation of the hybrid drive assembly's components and their communication.

Turning now to FIG. 6, illustrating a schematic showing an exemplary implementation of the hybrid drive assembly's components and their communication. For example, the hybrid drive assembly can be comprised of a rechargeable power source (RPS) 602 electrically coupled to the EM 300; an electronic speed controller (ESC 601) in electronic communication with RPS 601, the EM 300 and the CPM 500; a charge controller 606; and a rectifier 603 in communication with the CPM 500.

As indicated, in an exemplary implementation, the hybrid drive assembly further comprise a CPM (interchangeable with CCS), in communication with a non-transitory memory device, storing thereon a computer-readable medium with a set of executable, wherein the set of executable instruction is further configured when executed, to cause the at least one processor to: for predetermined combination of throttle position and RPM, determine appropriate ignition timing and fuel flowrate configured to yield maximum power; and inject appropriate fuel mixture (fuel:air) amount at appropriate timing to ICE configured to yield maximum power.

Furthermore and in another exemplary implementation, the set of executable instructions is configured, when executed, to cause the at least one processor to perform the steps of: using the rectifier 603, rectifying the electrical power signal received from the RPS 602, using the ESC 601, controlling the rectified power signal from the rectifier 603; and using the charge controller 606, controlling charging of RPS 602.

In yet another exemplary implementation, the set of executable instruction is further configured when executed, to cause the processor to: channel power from RPS 602 to the EM 300 alone; and disconnect electric motor phases from the ESC 601, and additionally or alternatively, during launch of the UAV, or during sole EM 300 operation, electronically couple the ESC 601 to the EM 300; during actuating ICE 200, electronically couple the ESC 601 to the EM 300 and to the ICE 200 at a predetermined control ratio, and/or during operation of the ICE 200, UAV cruising, RPS 602 charging, or any combination thereof, electronically decouple the ESC 601 from the EM 300; and during combined operation of the EM 300 and the ICE 200, electronically couple the ESC 601 to the EM 200.

In an exemplary implementation, the set of executable instruction is further configured when executed, to cause the at least one processor to: using the pressure gauge, continuously monitor pressure within SPFI module 220; upon determination of a drop in pressure of over a predetermined amount for a predetermined period, increase, or modulate at least one of: the injection period, the air/fuel mixture ratio, recouple the EM 300, change altitude, and a combination of the foregoing. Furthermore, while propeller rotation is provided solely by the ICE, the set of executable instruction is further configured when executed, to cause the at least one processor to: based on throttle 2403 position, determine the RPM expected under the actual fuel flow, and upon determining a drop in RPM over a predetermined amount (e.g., 150-500 RPM), actuate the EM 300 to, for example boost the ICE 200 operation and bring it within operational parameters under the circumstances. Moreover, following actuation of the EM 300 and upon determining the expected RPM corresponds to the throttle 2403 position, the set of executable instruction is further configured when executed, to cause the at least one processor to: shut the EM 300.

The processor, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, transient memory, non-transient memory, static memory, dynamic memory, flash memory, cache memory, and/or any device that stores digital information. Furthermore, the "processor" can include, but is not necessarily being limited to, an instruction execution system such as a computer/processor based system, an Application Specific Integrated Circuit (ASIC), a computing device, or a hardware and/or software system that can fetch or obtain the logic from a non-transitory storage medium or a non-transitory computer-readable storage medium and execute the instructions contained therein. The processor can also include any controller, state-machine, microprocessor, or any other analogue, digital and/or mechanical implementation thereof. In addition, the computer program (software and/or firmware), can comprise program code means for carrying out the steps of the methods described herein (for example, diverting power between the ESC, the EM and the rectifier), as well as a computer program product comprising program code means stored on a medium that can be read by a computer, or a storage medium that can be accessed via a data network, and may contain control command to affect the various operations of the drive assemblies described herein.

While particular exemplary implementations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

I claim:

1. A hybrid drive assembly for an unmanned aerial vehicles UAV) comprising:
    a) a housing frame
    b) an internal combustion engine (ICE) basally coupled to the housing frame;
    c) an electric motor (EM) having a shaft, apically and rotatably coupled to the housing frame;
    d) a propeller, rotatably coupled to the EM's shaft;
    e) a belt, operably coupled to the EM and the ICE;
    f) an adjustable coupling module, operably coupled to the housing frame, configured to selectably couple and decouple the EM and the ICE by selectably modulating the belt tension; and
    g) a central processing module (CPM) in communication with the adjustable coupling module, the EM, the ICE, and at least one processor with a non-transitory memory device storing thereon a computer-readable medium with an executable set of instructions, configured when executed to cause the processor to regulate the operation of the ICE, the EM, the adjustable coupling module, or any combination thereof.

2. The hybrid drive assembly of claim 1, wherein the housing frame further comprises:
    a) a plurality of vibration dampeners; and
    b) a guard frame, operably coupled to the EM.

3. The hybrid drive assembly of claim 2, wherein the adjustable coupling module comprises:
    a) a drive unit mounted on a basal end of the front beam of the housing's left bracket, the drive unit being in communication with the CPM;
    b) a guiding rail coupled to the front beam of the housing's left bracket;
    c) a sled coupled to the guiding rail, the sled defining a channel configured to slidably engage a guiding rail and an arm extending apically from the sled;
    d) a tension pulley, rotatably coupled to the sled and the tension belt;
    e) a locking member, defining a plurality of peripheral notches, the locking member operably coupled to the drive unit and to the sled; and
    f) a cam, hingedly coupled to a base frame, wherein the cam is configured to engage a peripheral notch defined in the locking member.

4. The hybrid drive assembly of claim 3, wherein the adjustable coupling module further comprises:
    a) a coupling rod having a first end coupled to the upper arm of the sled and a second end hingedly coupled to the locking member; and
    b) a biasing element hingedly coupling the cam to the base frame, operable to bias a protrusion extending from the cam toward the locking member, the protrusion configured to alternately engage the plurality of peripheral notches defined in the locking member, wherein upon actuating the drive unit, the locking member is configured to rotate, causing coupling rod to translate thereby engaging or disengaging the ICE and the EM.

5. The hybrid drive assembly of claim 4, wherein, when in a decoupled state, the propeller is solely rotated by the EM.

6. The hybrid drive assembly of claim 4, wherein, when in a coupled state, the coupling rod is translated downward causing the tension belt to engage the ICE.

7. The hybrid drive assembly of claim 1, wherein, in the coupled state, the protrusion extending from the cam is configured to engage one notch of the plurality of peripheral notches defined in the locking member to maintain the propeller operating at a predetermined range of revolutions per minutes (RPM).

8. The drive of claim 1, wherein the hybrid drive assembly further comprises:
    a) a rechargeable power source electrically coupled to the EM;
    b) an electronic speed controller (ESC) in electronic communication with the rechargeable power source, the EM and the CPM;
    c) a charge controller; and
    d) a rectifier in communication with the CPM.

9. The hybrid drive assembly of claim 8, wherein the set of executable instructions is configured, when executed, to cause the at least one processor to perform the steps of:
    a) using the rectifier, rectifying the electrical power signal received from the rechargeable power source,
    b) using the ESC, controlling the rectified power signal from the rectifier; and
    c) using the charge controller, controlling charging of the rechargeable power source.

10. The hybrid drive assembly of claim 9, wherein the EM is operable as an alternator to charge the rechargeable battery when in the decoupled state.

11. The hybrid drive assembly of claim 10, wherein the set of executable instruction is further configured when executed, to cause the processor to:
    a) channel power from the rechargeable power source to the EM alone; and b) disconnect electric motor phases from the ESC.

12. The hybrid drive assembly of claim 11, wherein the set of executable instruction is further configured when executed, to cause the processor to:
 a) during launch of the UAV, or during sole electric motor operation, electronically couple the ESC to the EM;
 b) during actuating the internal combustion engine, electronically couple the ESC to the EM and to the ICE at a predetermined control ratio;
 c) during operation of the ICE, UAV cruising, rechargeable power source charging, or any combination thereof, electronically decouple the ESC from the EM; and
 d) during combined operation of the EM and the ICE, electronically couple the ESC to the EM.

13. The hybrid drive assembly of claim 1 wherein the ICE has a volume of between 6 cubic centimeter (cc) and 25 cc, the ICE further comprises a single point fuel injection module in communication with the CPM, wherein the set of executable instruction is further configured when executed, to cause the processor to:
 a) for a predetermined combination of a throttle position and RPM, determine an appropriate ignition timing and fuel flowrate configured to yield maximum power; and
 b) inject the appropriate fuel amount at the appropriate timing to the ICE configured to yield maximum power.

14. The hybrid drive assembly of claim 13, wherein during launch of the UAV, or during sole EM operation, the electronic motor is further configured to solely receive operation commands from a flight control module in communication with the CPM.

15. The hybrid drive assembly of claim 14, wherein during at least one of operation of the ICE, UAV cruising, and rechargeable power source charging solely, the ICE is further configured to receive operation commands from the flight control module.

16. The hybrid drive assembly of claim 13, wherein, the set of executable instruction is further configured when executed, to cause the processor to:
 a. terminate actuating the ICE by the EM when the intra-phases current has dropped below a predetermined level; or
 b. terminate actuating of the ICE by the EM when the intra-phases current has NOT dropped below a predetermined level after a predetermined period.

17. The hybrid drive assembly of claim 13, wherein the single point fuel injection module further comprises a pressure gauge in communication with the CPM, the pressure gauge operable to measure fuel pressure in the single point fuel injection module, and wherein the set of executable instruction is further configured when executed, to cause the processor to:
 a) using the pressure gauge, continuously monitor pressure within the single point fuel injection module;
 b) upon determination of a drop in pressure of over a predetermined amount for a predetermined period, increase the injection period.

18. The hybrid drive assembly of claim 13, wherein when coupled, while propeller rotation is provided solely by the ICE, the set of executable instruction is further configured when executed, to cause the processor to:
 a) based on throttle position, determine the RPM expected under the actual fuel flow
 b) upon determining a drop in RPM over a predetermined amount, actuate the EM.

19. The hybrid drive assembly of claim 18, whereby following actuation of the EM and upon determining the expected RPM corresponds to the throttle position, the set of executable instruction is further configured when executed, to cause the processor to:
 a) decouple the EM; and
 b) shut the EM.

20. The hybrid drive assembly of claim 13, wherein the ICE comprises:
 a) a plurality of cylinders;
 b) a manifold in liquid communication with the plurality of cylinders and the single point fuel injection module, wherein the pressure gauge is operable to measure manifold pressure.

* * * * *